(12) United States Patent
Gilra

(10) Patent No.: US 7,689,928 B1
(45) Date of Patent: Mar. 30, 2010

(54) METHODS AND APPARATUS FOR PLACING AND INTERPRETING REFERENCE MARKS ON SCROLLBARS

(75) Inventor: Anant Gilra, Karnatak (IN)

(73) Assignee: Adobe Systems Inc., San Jose, CA (US)

( * ) Notice: Subject to any disclaimer, the term of this patent is extended or adjusted under 35 U.S.C. 154(b) by 649 days.

(21) Appl. No.: 11/541,496

(22) Filed: Sep. 29, 2006

(51) Int. Cl.
G06F 3/048 (2006.01)

(52) U.S. Cl. ..................... 715/787; 715/786

(58) Field of Classification Search ............. 715/786, 715/787
See application file for complete search history.

(56) References Cited

U.S. PATENT DOCUMENTS

| | | | | |
|---|---|---|---|---|
| 5,479,600 A * | 12/1995 | Wroblewski et al. | ........ | 715/787 |
| 5,506,951 A * | 4/1996 | Ishikawa | ........ | 715/786 |
| 5,644,692 A * | 7/1997 | Eick | ........ | 715/833 |
| 5,909,207 A * | 6/1999 | Ho | ........ | 345/156 |
| 6,064,384 A * | 5/2000 | Ho | ........ | 715/839 |
| 6,389,434 B1 * | 5/2002 | Rivette et al. | ........ | 715/209 |
| 6,407,757 B1 * | 6/2002 | Ho | ........ | 715/776 |
| 6,533,822 B2 * | 3/2003 | Kupiec | ........ | 715/253 |
| 6,778,192 B2 * | 8/2004 | Arbab et al. | ........ | 715/786 |
| 6,940,532 B1 * | 9/2005 | Fukui et al. | ........ | 715/784 |
| 7,100,119 B2 * | 8/2006 | Keely et al. | ........ | 715/776 |
| 7,103,851 B1 * | 9/2006 | Jaeger | ........ | 715/786 |
| 7,159,188 B2 * | 1/2007 | Stabb et al. | ........ | 715/787 |
| 7,328,411 B2 * | 2/2008 | Satanek | ........ | 715/786 |
| 7,475,365 B2 * | 1/2009 | Nan et al. | ........ | 715/854 |
| 2002/0186252 A1 * | 12/2002 | Himmel et al. | ........ | 345/787 |
| 2005/0091027 A1 * | 4/2005 | Zaher et al. | ........ | 703/22 |
| 2005/0091604 A1 * | 4/2005 | Davis | ........ | 715/772 |
| 2005/0147953 A1 * | 7/2005 | Ho | ........ | 434/317 |
| 2005/0210403 A1 * | 9/2005 | Satanek | ........ | 715/786 |
| 2006/0075357 A1 * | 4/2006 | Guido et al. | ........ | 715/784 |
| 2006/0184901 A1 * | 8/2006 | Dietz | ........ | 715/855 |
| 2007/0083823 A1 * | 4/2007 | Jaeger | ........ | 715/787 |
| 2007/0143705 A1 * | 6/2007 | Peters | ........ | 715/786 |

* cited by examiner

*Primary Examiner*—Tadesse Hailu
*Assistant Examiner*—Nicholas S Ulrich
(74) *Attorney, Agent, or Firm*—Chapin IP Law, LLC

(57) ABSTRACT

Methods and apparatus for placing and interpreting reference marks on scrollbars are disclosed. A reference mark indicates a portion of document displayed in a window on a display device. To place a reference mark, a selection of a portion of a document is received. A command to mark the selection with a reference mark is then received. A reference mark is then placed in the scrollbar, the reference mark indicating the selected portion of the document. To interpret a reference mark, a selection of a reference mark located on a scrollbar is received from an input device. The scrollbar is associated with a document. The display of the document in the window on the display device is then changed so that at least the beginning of a portion of the document indicated by the reference mark is displayed in the window on the display device.

20 Claims, 8 Drawing Sheets

FIG. 2A

401 - RECEIVE A SELECTION OF CONTENT IN A DOCUMENT

402 - RECEIVE A COMMAND TO MARK THE SELECTED CONTENT WITH A REFERENCE MARK

403 - PLACE A REFERENCE MARK IN THE SCROLLBAR, WHEREIN THE REFERENCE MARK INDICATES THE SELECTED CONTENT

FIG. 4A

404 - RECEIVE A SELECTION OF A PAGE OF A DOCUMENT

405 - RECEIVE A COMMAND TO MARK THE SELECTED PAGE WITH A REFERENCE MARK

406 - PLACE A REFERENCE MARK IN THE SCROLLBAR, WHEREIN THE REFERENCE MARK INDICATES THE SELECTED PAGE

FIG. 4B

407 - RECEIVE A SELECTION OF A ROW OR A COLUMN IN A SORTABLE CHART, WHEREIN THE ROW OR THE COLUMN INCLUDES AN IDENTIFIER, WHEREIN THE IDENTIFIER IDENTIFIES AT LEAST ONE ROW OR COLUMN IN THE SORTABLE CHART

408 - RECEIVE A COMMAND TO MARK THE SELECTED ROW OR COLUMN OF THE SORTABLE CHART WITH A REFERENCE MARK

409 - PLACE A REFERENCE MARK IN THE SCROLLBAR FOR EACH ROW OR COLUMN THAT HAS THE IDENTIFIER OF THE SELECTED ROW OR COLUMN

FIG. 4C

501 - RECEIVE A SELECTION OF A FIRST REFERENCE MARK LOCATED ON A SCROLLBAR, THE SCROLLBAR ASSOCIATED WITH A DOCUMENT, THE REFERENCE MARK INDICATING A PORTION OF A DOCUMENT, THE DOCUMENT DISPLAYED IN A WINDOW ON A DISPLAY DEVICE, WHEREIN THE SELECTION IS MADE WITH AN INPUT DEVICE

502 - CHANGE THE DISPLAY OF THE DOCUMENT IN THE WINDOW ON THE DISPLAY DEVICE SO THAT AT LEAST THE BEGINNING OF A FIRST PORTION OF THE DOCUMENT INDICATED BY THE FIRST REFERENCE MARK IS DISPLAYED IN THE WINDOW ON THE DISPLAY DEVICE

503 - HIGHLIGHT THE FIRST PORTION OF THE DOCUMENT INDICATED BY THE SELECTED FIRST REFERENCE MARK WHEN THAT PORTION IS DISPLAYED IN THE WINDOW ON THE DISPLAY DEVICE

504 - PREVIEW A FIRST PORTION OF THE DOCUMENT INDICATED BY A FIRST REFERENCE MARK BY DISPLAYING SOME OF THE FIRST PORTION OF THE DOCUMENT WHEN A CURSOR IS PLACED OVER THE FIRST REFERENCE MARK ON THE SCROLLBAR

505 - MAKE THE FIRST PORTION OF THE DOCUMENT INDICATED BY THE SELECTED FIRST REFERENCE MARK AVAILABLE FOR EDITING OPERATIONS

FIG. 5

701 - RECEIVE A SELECTION OF A FIRST REFERENCE MARK LOCATED ON A SCROLLBAR, THE SCROLLBAR ASSOCIATED WITH A DOCUMENT, WHEREIN THE SELECTION IS MADE WITH AN INPUT DEVICE, AND WHEREIN THE FIRST PORTION OF THE DOCUMENT INDICATED BY THE FIRST REFERENCE MARK IS CONTENT

702 - CHANGE THE DISPLAY OF THE DOCUMENT IN THE WINDOW ON THE DISPLAY DEVICE SO THAT AT LEAST THE BEGINNING OF THE CONTENT INDICATED BY THE FIRST REFERENCE MARK IS DISPLAYED IN THE WINDOW ON THE DISPLAY DEVICE

FIG. 7A

703 - RECEIVE A SELECTION OF A FIRST REFERENCE MARK LOCATED ON A SCROLLBAR, THE SCROLLBAR ASSOCIATED WITH A DOCUMENT, WHEREIN THE SELECTION IS MADE WITH AN INPUT DEVICE, AND WHEREIN THE FIRST PORTION OF THE DOCUMENT INDICATED BY THE FIRST REFERENCE MARK IS A PAGE

704 - CHANGE THE DISPLAY OF THE DOCUMENT IN THE WINDOW ON THE DISPLAY DEVICE SO THAT AT LEAST THE BEGINNING OF THE PAGE INDICATED BY THE FIRST REFERENCE MARK IS DISPLAYED IN THE WINDOW ON THE DISPLAY DEVICE

FIG. 7B

705 - RECEIVE A SELECTION OF A FIRST REFERENCE MARK LOCATED ON A SCROLLBAR, THE SCROLLBAR ASSOCIATED WITH A DOCUMENT, WHEREIN THE SELECTION IS MADE WITH AN INPUT DEVICE, AND WHEREIN THE FIRST PORTION OF THE DOCUMENT INDICATED BY THE FIRST REFERENCE MARK IS A ROW OR COLUMN OF A SORTABLE CHART

706 - CHANGE THE DISPLAY OF THE DOCUMENT IN THE WINDOW ON THE DISPLAY DEVICE SO THAT AT LEAST THE BEGINNING OF THE FIRST ROW OR COLUMN OF THE SORTABLE CHART INDICATED BY THE FIRST REFERENCE MARK IS DISPLAYED IN THE WINDOW ON THE DISPLAY DEVICE

FIG. 7C

METHODS AND APPARATUS FOR PLACING AND INTERPRETING REFERENCE MARKS ON SCROLLBARS

BACKGROUND

Scrollbars are used in a variety of software applications, particularly those displayed in a so-called window that is shown on a computer display device. A window is typically able to display only a portion of a document or other file at a time. The scrollbar allows a user of the software application displayed in the window to select the portion of the document or other file to be displayed. Thus, the user is able traverse different sections of a document or other file that otherwise cannot be efficiently displayed in the window at the same time. For example, in a word processing application, a user who wishes to edit a seventy-page document would not want all seventy pages to be displayed at the same time. A scrollbar allows that user to effectively choose which portion of the document to look at by providing input to the scrollbar. Similarly, scrollbars may be used within a document as well, to show only a portion of an item in a document, such as a table or a chart, at a time. A user is again able to effectively choose which portion the item is displayed by providing input to the scrollbar. In any situation, the user provides input to the scrollbar through an input device such as a keyboard, a mouse, a trackball etc.

For example, one way of providing input to a scrollbar is to use an input device such as a mouse or trackpad to click on a movable slider displayed in the scrollbar. The movable slider corresponds to a relative position of the document as currently displayed in the window. By moving the mouse/trackpad, the movable slider correspondingly moves in the scrollbar, and the portion of the document that is displayed in the window also changes accordingly, allowing the user to view a different portion of the document. Similarly, by moving a cursor or other type of input indicator using, for example, a keyboard, to scroll through the content of a document, the movable slider in the scrollbar will correspondingly move and indicate a relative position on the document.

Scrollbars may be placed in a variety of locations in a window. For example, word processing applications and web browsers typically include two scrollbars, one placed on the right edge of the window, for scrolling up and down, and one near the bottom edge of the window, for scrolling right and left. Other applications, such as image editing applications, may place the left-right scrollbar near the top edge of the window, and still other applications, such as graphics applications, typically include two left-right scrollbars, one near the top edge of the window and one near the bottom edge, and two up-down scrollbars, one on the right edge of the window and one on the left edge of the window.

SUMMARY

Conventional scrollbar technologies, however, do not allow a user to quickly and easily return to a particular area of interest and have that content automatically be selected with just a single action with an input device, such as a single click of a mouse. Other technologies are capable of providing a user with a way to return to a certain area of interest in a document. However, these technologies often require the user to take multiple actions with an input device, and do not provide a way for the content to be selected without the user taking further actions with an input device. For example, the Acrobat series of software applications made by Adobe Systems Incorporated of San Jose, Calif., allow a user to insert one or more bookmarks into a Portable Document Format (PDF) document. These bookmarks allow a user to return to a point of interest in the PDF document. However, to access the bookmarks via a tabbed section in any of the Acrobat applications, a user must use an input device such as a mouse to take at least one action to open the bookmarks tab, and then another action to activate the desired bookmark. If the bookmarks tab is not shown, the user must use the input device to take at least one more action to have the bookmarks tab displayed. Further, taking an action with the input device to activate the bookmark only returns the display of the document to the bookmarked position of interest in the PDF document; it does not select the content near or at that position of interest, and offers no preview of the content of interest. Indeed, if the user wishes to select the content, for example to copy and paste it, that requires the user to take yet another action with the input device. Further, if there is specific content embedded within the document, such as a chart, graphic, endnote, footnote, comment, etc, the bookmark may only return the display of the document to the page or portion of the page including that specific content, instead of going directly to the specific content itself.

Embodiments of the invention significantly overcome such problems by providing for reference marks that may be placed on a scrollbar. As a user scrolls through a document displayed in a window, the user may come upon a point of interest in the document. The user is then able to, using an input device such as a mouse, select the content that is of interest to the user, and then indicate that a reference mark should be placed in the scrollbar. The reference mark corresponds to the position in the document of the point of interest, and indicates the content of interest. For example, if the user is reviewing a large PDF version of a word processing document, and wishes to be able to return to a particular paragraph that defines an idea that is central to the premise of the document, the user selects the paragraph with a mouse or other input device. The user then uses the input device to, for example, click somewhere on the paragraph with the mouse to make a menu appear. In the menu that appears, there is an entry for creating a reference mark, which the user then selects with the input device. A reference mark is then placed in the scrollbar, corresponding to the relative position of that selected paragraph in the document. Alternatively, the user may use the input device to double click or otherwise select the scrollbar, which would cause a reference mark to appear in the appropriate place on the scrollbar. When the user wishes to return to that particular paragraph, the user only needs to select the reference mark in the scrollbar with the input device, and the display of the document in the window returns to the reference-marked paragraph. Additionally, the reference-marked paragraph may be automatically selected. This allows the user to more easily see the paragraph, and to be instantly able to perform editing operations on the paragraph, such as copying and pasting the paragraph, without having to manually select it. A user may also select multiple reference marks in a particular order, and the contents of each of the reference-marked portions of the document will be available to, for example, be copied and pasted into another document. In this situation, not all of the selected reference-marked portions of the document will be shown at the same time. However, even if there is other information in between the selected reference-marked portions, only the reference-marked portions will be selected. This allows a user to, for example, easily copy and paste non-contiguous content from a document by taking only a small number of actions with an input device.

Reference marks may be placed at any point in a document, and may be portrayed distinctly on the scrollbar to identify different portions of a document that have been reference-marked. For example, a section of text that a user reference-marks may be indicated by a blue reference mark on the scrollbar, while a graphic that a user reference-marks may be indicated by a red reference mark on the scrollbar. If the document includes comments such as endnotes or footnotes, or other types of notes or tags, these may also be reference-marked, and the corresponding reference mark on the scrollbar may be, for example, yellow. Any different portion of a document, such as tables, web links, photographs, graphs, charts, audio content, video content, multimedia content, and so on, may have an associated type of reference mark. Pages in a document may also be reference-marked, and then a user need only select the corresponding reference mark with an input device to immediately go to that page. The reference marks may be configured such that, when a cursor is placed over the reference mark, a preview of the content that has been reference-marked is displayed. For example, if a paragraph is reference-marked, placing a cursor over the corresponding reference mark may display the first line on the paragraph, regardless of what portion of the document is currently being displayed. If a page is reference-marked, placing a cursor over the corresponding reference mark may display the first line of the page.

Reference marks may also be used to help locate data in a table or other data structure. For example, in a document that includes a sortable table or chart, a user may have reference marks placed on a scrollbar that correspond to certain columns or rows within the chart. These reference marks may correspond to, for example, the first letter or other character in the first entry in that column. This would allow a user to quickly and easily jump around within the table or chart.

More particularly, in an embodiment there is provided a method of placing a reference mark for a document on a scrollbar. The method includes receiving a selection of a portion of the document; receiving a command to mark the selection of the portion of the document with a reference mark; and placing a reference mark in the scrollbar, wherein the reference mark indicates the selected portion of the document.

In a related embodiment, receiving a command may include receiving a command to mark the selection of the portion of the document with a reference mark by receiving input from an input device, wherein the input indicates that a user used the input device to click on the scrollbar. In another related embodiment, receiving a command may include receiving a command to mark the selection of the portion of the document with a reference mark by receiving input from an input device, wherein the input indicates that a user used the input device to select an entry in a menu.

In still another related embodiment, placing may include placing a reference mark in the scrollbar, wherein at least one characteristic of the reference mark depends on the selected portion of the document. In yet another related embodiment, receiving a selection may include receiving a selection of content in a document; and receiving a command may include receiving a command to mark the selected content with a reference mark; and placing may include placing a reference mark in the scrollbar, wherein the reference mark indicates the selected content.

In yet still another related embodiment, receiving a selection may include receiving a selection of a page of a document; and receiving a command may include receiving a command to mark the selected page with a reference mark; and placing may include placing a reference mark in the scrollbar, wherein the reference mark indicates the selected page. In still another related embodiment, receiving a selection may include receiving a selection of a column in a sortable chart, wherein the column includes an identifier, wherein the identifier identifies at least one column in the sortable chart; and receiving a command may include receiving a command to mark the selected column of the sortable chart with a reference mark; and placing may include placing a reference mark in the scrollbar for each column that has the identifier of the selected column.

In another embodiment, there is provided a method of interpreting a reference mark on a scrollbar. The reference mark indicates a portion of a document, and the document is displayed in a window on a display device. The method includes receiving a selection of a first reference mark located on a scrollbar, the scrollbar associated with a document, wherein the selection is made with an input device; and changing the display of the document in the window on the display device so that at least the beginning of a first portion of the document indicated by the first reference mark is displayed in the window on the display device.

In a related embodiment, receiving may include receiving a selection of a first reference mark located on a scrollbar, the scrollbar associated with a document, wherein the selection is made with an input device, and wherein the first portion of the document indicated by the first reference mark is content, and changing may include changing the display of the document in the window on the display device so that at least the beginning of the content indicated by the first reference mark is displayed in the window on the display device.

In another related embodiment, receiving may include receiving a selection of a first reference mark located on a scrollbar, the scrollbar associated with a document, wherein the selection is made with an input device, and wherein the first portion of the document indicated by the first reference mark is a page; and changing may include changing the display of the document in the window on the display device so that at least the beginning of the page indicated by the first reference mark is displayed in the window on the display device.

In another related embodiment, receiving may include receiving a selection of a first reference mark located on a scrollbar, the scrollbar associated with a document, wherein the selection is made with an input device, and wherein the first portion of the document indicated by the first reference mark is a column of a sortable chart; and changing may include changing the display of the document in the window on the display device so that at least the beginning of the (first column of the sortable chart) indicated by the first reference mark is displayed in the window on the display device.

In another related embodiment, the method may include highlighting the first portion of the document indicated by the selected first reference mark when that portion is displayed in the window on the display device. In still another related embodiment, the method may include previewing a first portion of the document indicated by a first reference mark by displaying some of the first portion of the document when a cursor is placed over the first reference mark on the scrollbar.

In yet another related embodiment, the method may include making the first portion of the document indicated by the selected first reference mark available for editing operations. In still yet another related embodiment, the method may include receiving a selection of a second reference mark with the input device, the second reference mark located on the scrollbar, the second reference mark indicating a second portion of the document that is not contiguous with the first portion of the document indicated by the first reference mark;

and making the portions of the document indicated by the selected reference marks available for editing operations according to the order the reference marks corresponding to those portions were selected.

In another embodiment, there is provided a computer system. The computer system includes a memory; a processor; a display; and an interconnection mechanism coupling the memory, the processor and the display allowing communication there between. The memory is encoded with a reference marking application, that when executed in the processor, provides a reference marking process that places a reference mark for a document on a scrollbar, by causing the computer system to perform the operations of: receiving a selection of a portion of the document; receiving a command to mark the selection of the portion of the document with a reference mark; and placing a reference mark in the scrollbar, wherein the reference mark indicates the selected portion of the document.

In another embodiment, there is provided a computer system. The computer system includes a memory; a processor; a display, wherein a document is displayed in a window on the display; an input device; and an interconnection mechanism coupling the memory, the processor, the display and the input device allowing communication there between. The memory is encoded with a reference mark interpretation application, that when executed in the processor, provides a reference mark interpretation process that interprets a reference mark for a document, wherein the reference mark is located on a scrollbar associated with the document, by causing the computer system to perform the operations of: receiving a selection of a first reference mark located on a scrollbar, wherein the selection is made with the input device; and changing the display of the document in the window on the display device so that at least the beginning of a first portion of the document indicated by the first reference mark is displayed in the window on the display device.

In another embodiment, there is provided a computer program product, stored on computer readable medium, to place a reference mark for a document on a scrollbar associated with the document, the document displayed in a window on a display device that is part of a computer system. The computer program product includes computer program code for receiving a selection of a portion of the document from an input device, wherein the input device is part of the computer system; computer program code for receiving a command to mark the selection of the portion of the document with a reference mark, wherein the command is received from the input device; and computer program code for placing a reference mark in the scrollbar, wherein the reference mark indicates the selected portion of the document.

In another embodiment, there is provided a computer program product, stored on computer readable medium, to interpret a reference mark on a scrollbar, the reference mark indicating a portion of a document, the document displayed in a window on a display device, the display device part of a computer system. The computer program product includes computer program code for receiving a selection of a first reference mark, wherein the selection is made with an input device, wherein the input device is part of the computer system; and computer program code for changing the display of the document in the window on the display device so that at least the beginning of a first portion of the document indicated by the first reference mark is displayed in the window on the display device.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A and 2B show screenshots of a graphical user interface incorporating a reference marking application and a reference mark interpretation application according to embodiments disclosed herein.

FIGS. 4A-4C illustrate flowcharts of a procedure performed by the system of FIG. 1 when the reference marking application is executed to place a reference mark on a scrollbar for a particular content, page, or sortable chart.

FIG. 5 illustrates a flowchart of a procedure performed by the system of FIG. 1 when the reference mark interpreter application is executed to interpret a selected reference mark on a scrollbar.

FIGS. 7A-7C illustrate flowcharts of a procedure performed by the system of FIG. 1 when the reference mark interpreter application is executed to interpret a selected reference mark on a scrollbar for a particular content, page, or sortable chart.

DETAILED DESCRIPTION

Generally, disclosed embodiments include methods and apparatus for placing a reference mark on a scrollbar, and interpreting a reference mark located on a scrollbar. With reference marks, a user is able to quickly and easily indicate portions of document that are of interest to the user. Because the reference marks are placed in the scrollbar, the user is also able to quickly and easily access the reference-marked portions of the document. By using an input device, the user selects a portion of a document to be reference-marked. Any element or elements within a document may be selected. A reference marking process receives this selection along with a command to reference mark the selected portion, and places a reference mark corresponding to that selected portion of the document on the scrollbar. The user may then, with the input device, select a reference mark, and a reference mark interpreter process will change the display of the document so that the portion of the document indicated by the selected reference mark is shown. Reference marks may vary in characteristics, to indicate different elements within a document that have been reference-marked. Additionally, the user may see a preview of the portion of the document a reference mark refers to by placing a cursor or other input marker over the reference mark. Selecting a reference mark may make the portion of the document indicated by the selected reference mark available for operations such as editing operations. Further, a user may select two or more reference marks to make the portions of the document indicated by those reference marks available for operations even if those portions of the document are not next to each other. Reference marks may also be used to located certain elements within a document and/or within a sortable chart.

Figure 1:
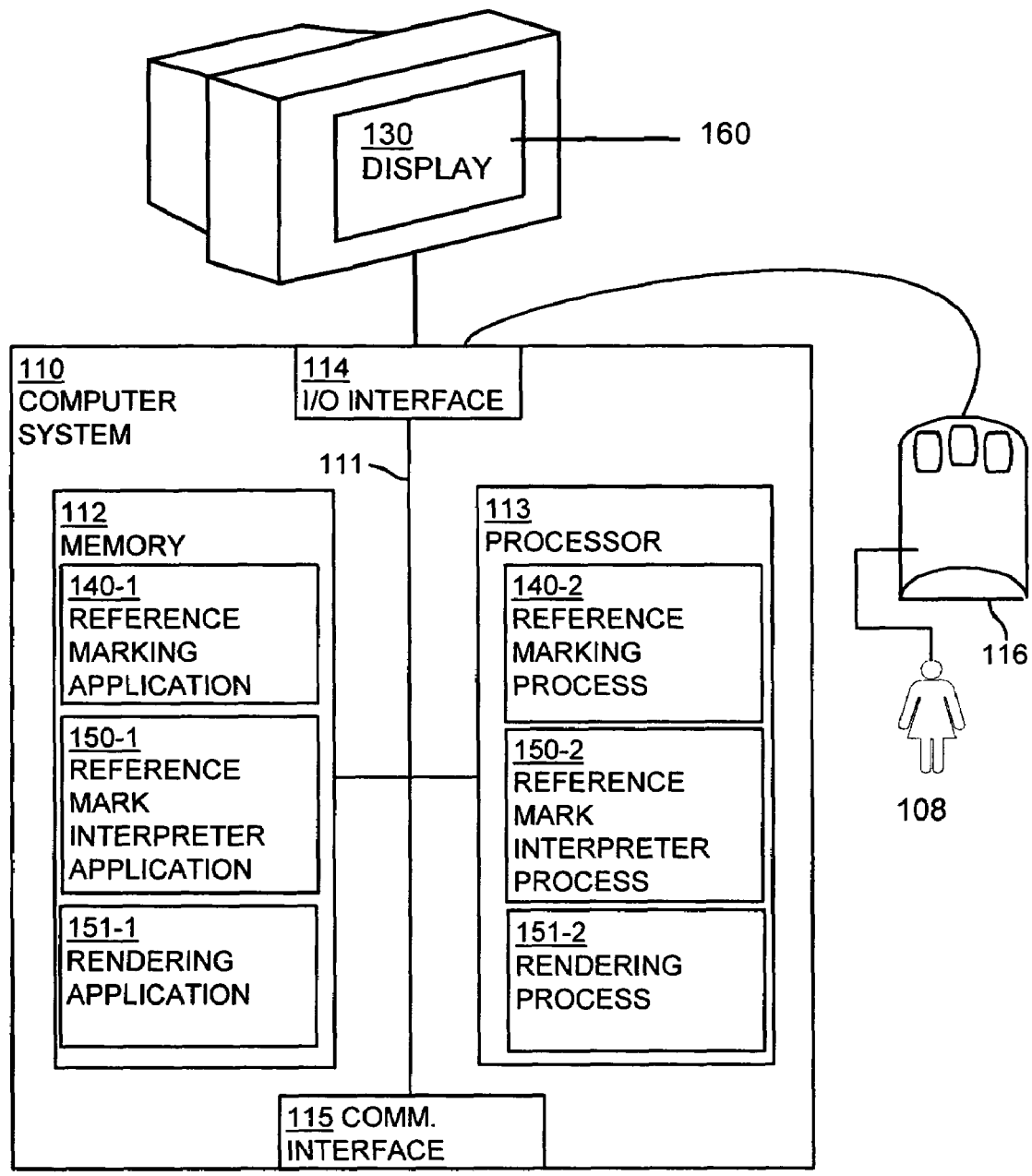
FIG. 1 shows a high-level block diagram of a computer system according to one embodiment disclosed herein.

FIG. 1 is a block diagram illustrating example architecture of a computer system 110 that executes, runs, interprets, operates or otherwise performs a reference marking application 140-1 and a reference marking process 140-2 suitable, as well as a reference mark interpreter application 150-1 and a reference mark interpreter process 150-2, for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as an editor of a word processing document to provide input commands and generally control a graphical user interface 160 on a display 130. The communications interface 115 enables the computer system 110 to communicate with other devices (e.g., other computers) on a network (not shown in FIG. 1).

The memory system 112 is any type of computer readable medium and in this example is encoded with a reference marking application 140-1 and a reference mark interpreter application 150-1. The reference marking application 140-1 and the reference mark interpreter application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the reference marking application 140-1 and/or the reference mark interpreter application 150-1. Execution of the reference marking application 140-1 in this manner produces processing functionality in a reference marking process 140-2. Similarly, execution of the reference mark interpreter application 150-1 in this manner produces processing functionality in a reference mark interpreter process 150-2. In other words, the reference marking process 140-2 represents one or more portions or runtime instances of the reference marking application 140-1 performing or executing within or upon the processor 113 in the computer system 110 at runtime, and the reference mark interpreter process 150-2 represents one or more portions or runtime instances of the reference mark interpreter application 150-1 performing or executing within or upon the processor 113 in the computer system 110 at runtime.

Figure 2A:
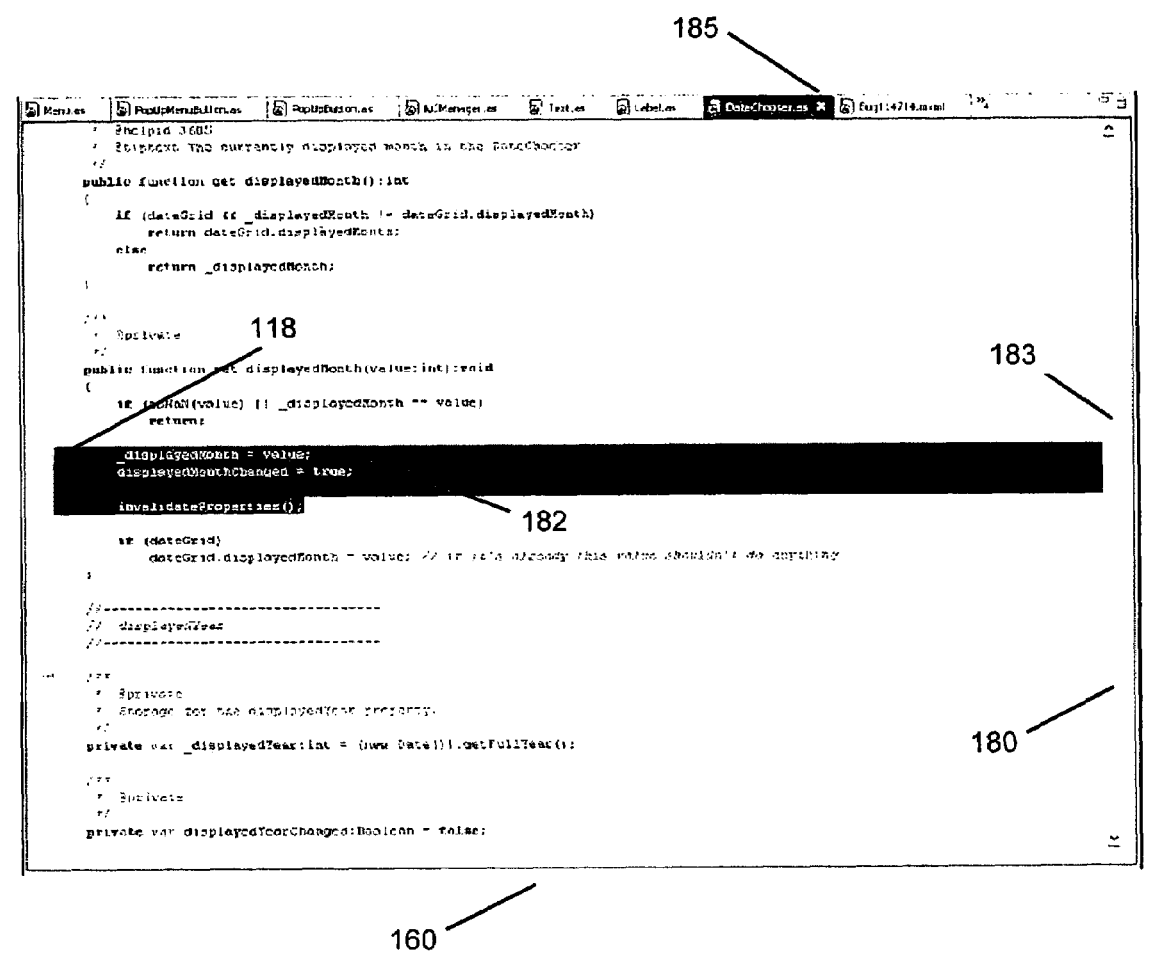
Figure 2B:
Figure 3:
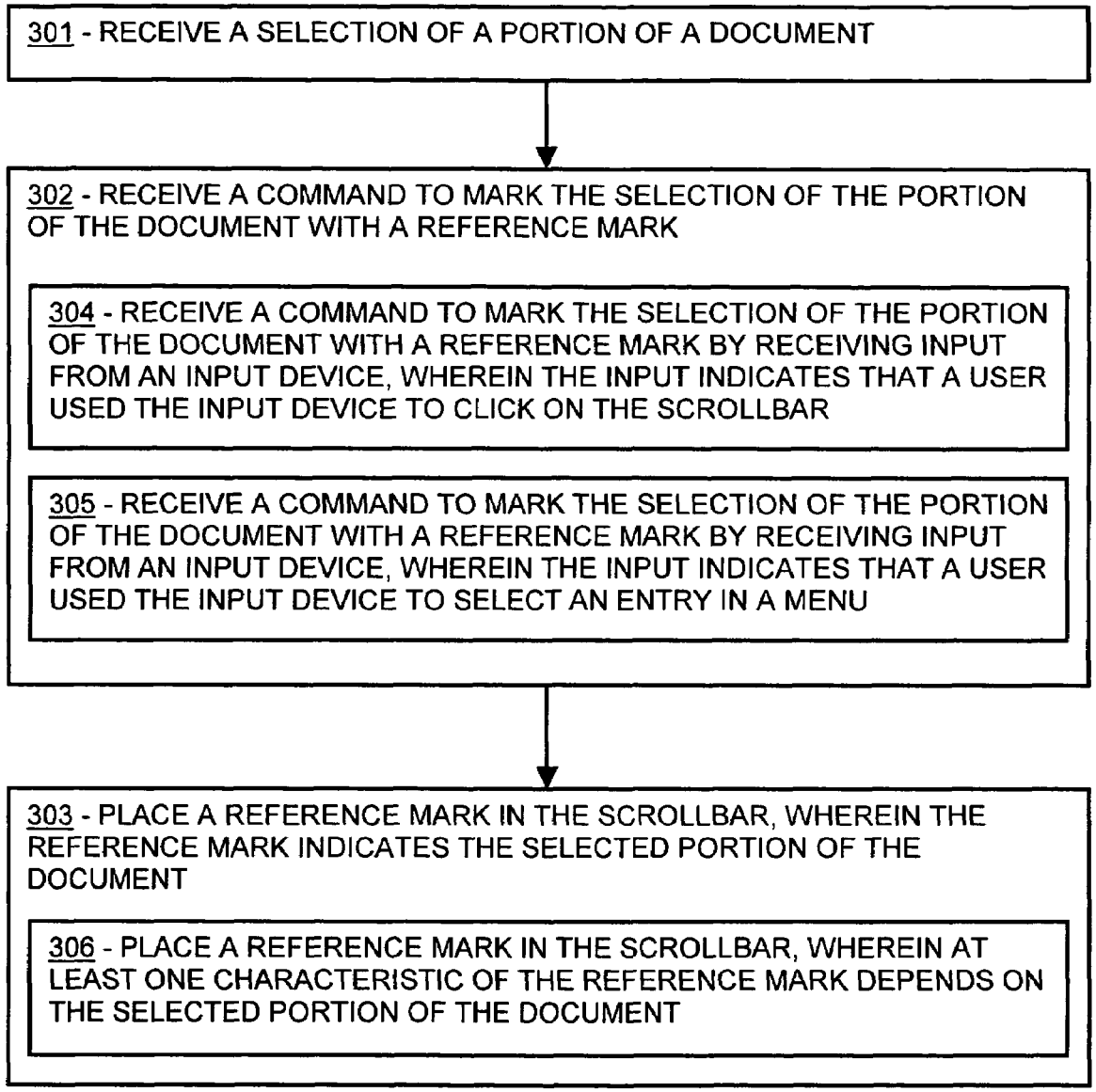
FIG. 3 illustrates a flowchart of a procedure performed by the system of FIG. 1 when the reference marking application is executed to place a reference mark on a scrollbar.
Figure 6:
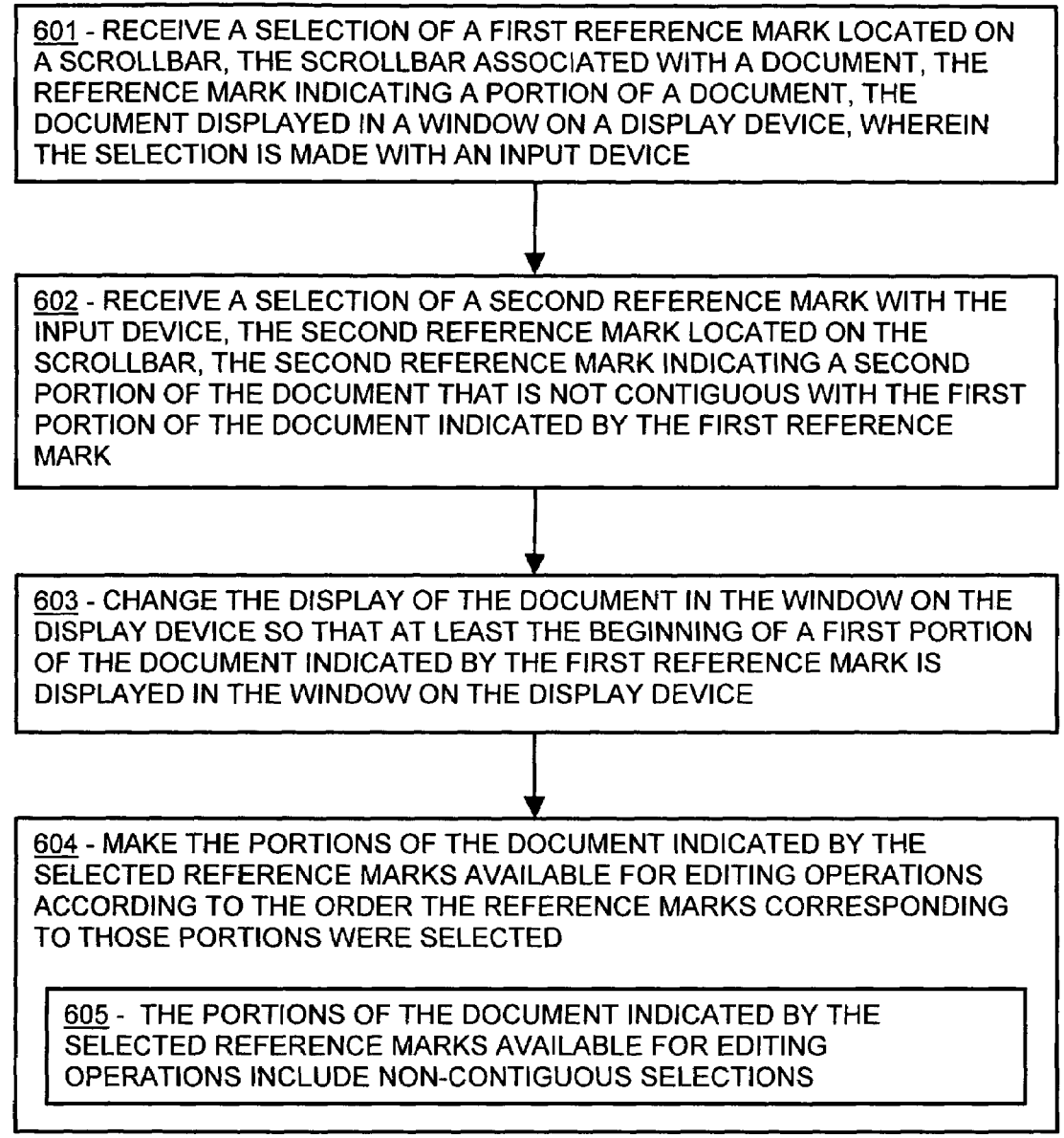
FIG. 6 illustrates a flowchart of a procedure performed by the system of FIG. 1 when the reference mark interpreter application is executed to interpret two or more selected reference marks on a scrollbar, according to one embodiment disclosed herein.

Generally, while operating the computer system 110, the user 108 manipulates at least one input device 116, such as a computer mouse. Through the manipulation of the at least one input device 116, the user 108 may provides input to an element of a graphical user interface 160 (shown in FIGS. 2A and 2B), such as a scrollbar 180 (shown in FIGS. 2A and 2B), which is shown on the display 130. For example, the user 108 might engage the reference marking application 140-1 by selecting content 182 of a document (shown in FIGS. 2A and 2B) displayed on the graphical user interface 160 with the input device 116, and then double-clicking in a location on the scrollbar 180 with the input device 116. The reference marking process 140-2 receives signals indicating an identity of the selected content 182 and operates as explained below to place one or more reference marks 184 on the scrollbar 180 (as shown in FIG. 2B). It should be noted that the reference mark illustrated in 184 is merely exemplary, and other type of graphical indicators or marks may be used. Similarly, the user 108 might engage the reference mark interpreter application 150-1 by double-clicking on a reference mark 184 with the input device 116. The reference mark interpreter process 150-2 receives signal indicating an identity of the selected reference 184 and operates as explained below to change the display of the document on the graphical user interface 160 so that at least the beginning of the content 182 associated with the reference mark 184 is displayed on the display 130.

It is noted that example configurations disclosed herein include the reference marking application 140-1 itself including the reference marking process 140-2, and the reference mark interpreter application 150-1 itself including the reference mark interpreter process 150-2 (i.e., in the form of un-executed or non-performing logic instructions and/or data). The reference marking application 140-1 and/or the reference mark interpreter application 150-1 may be stored on a computer readable medium (such as a floppy disk), hard disk, electronic, magnetic, optical or other computer readable medium. The reference marking application 140-1 and/or the reference mark interpreter application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the reference marking application 140-1 in the processor 113 as the reference marking process 140-2, and the execution of the reference mark interpreter application 150-1 in the processor 113 as the reference mark interpreter process 150-2. Those skilled in the art will understand that the computer system 110 may include other processes and/or software and hardware components, such as an operating system not shown in this example.

The display 130 need not be coupled directly to computer system 110. For example, the reference marking application 140-1 and/or the reference mark interpreter application 150-1 may be executed on a remotely accessible computerized device via the network interface 115. In this instance, the graphical user interface 160 may be displayed locally to a user of the remote computer and execution of the processing herein may be client-server based.

Embodiments below disclose placing and interpreting reference marks 184 on a scrollbar 180. FIGS. 2A and 2B are example screenshots of a graphical user interface 160 incorporating a reference marking application 140-1 and a reference mark interpretation application 150-1. FIGS. 3-7 are flowcharts of various embodiments of the reference marking process 140-2 and the reference mark interpreter process 150-2.

A scrollbar such as the scrollbar 180 shown in FIGS. 2A and 2B is placed on the graphical user interface 160 by a rendering process 151-2 (shown in FIG. 1). The rendering process uses stored data elements that define, among other things, the length of the scrollbar 180, the size and position of a slider element 183, and other characteristics of the scrollbar 180, to produce the image of the scrollbar 180. A window of the graphical user interface 160, such as the window 185, may contain one or more scrollbars, depending on what is being displayed within the window 185. For example, a typical word processing document displayed in a window includes two scrollbars (not shown), one along the right side of the window that scrolls the document in an up or down direction, and one along the bottom side of the window that scrolls the document in a right or left direction. Characteristics of the scrollbar, such as the size of the slider, may depend on the size of the window as well as the size of the document being displayed in the window, and the position of the document within the window. Additionally, a document may contain scrollbars within the document itself. For example, an HTML document containing a large nested table may have two scrollbars in its window, similar to those of a word processing document, as well as scrollbars for the nested table itself.

A user 108 (not shown in FIGS. 2A and 2B) may select any portion of a document that is displayed in a window or other element of a graphical user interface by manipulating an input device (represented on the graphical user interface by a pointer (not shown) or a cursor 118 (shown in FIG. 2A)). The portion of the document selected by the user 108 may be any component of the document, such as text 182 (shown in FIG. 2A), a graphic or image, audio, video, multimedia elements, a chart, comments such as endnotes or footnotes, headers, footers, links, or any combination of components. The portion may also be of any size, up to and including the entirety of the document. Optionally, a menu option is provided which is used to enable reference marks on the notes or callouts or clouds etc. This is used to color reference marks for all notes in a file (e.g., a .pdf file). Colors for notes would be different from colors for callouts, clouds. A dialog box is provided which has a list of all these—notes/callouts/clouds etc, where reference marks can be enabled. For example, if there are 20 notes in a document, selecting "Enable reference marks on notes" would bring in 20 reference marks of the same color on the scrollbar. Mousing over them would display the first line of the note.

The reference marking process 140-2 receives the selection of the portion of the document, step 301. The selected portion of the document may determine the type of reference mark that is placed on the scrollbar, as will be described in greater detail below. The user 108 now must indicate that the selected portion of the document should be reference-marked. The user 108 does this by providing a command to reference mark the selected portion of the document with the input device 116. For example, the user 108 may use the input device 116 to indicate the scrollbar, such as by clicking or double-clicking on the scrollbar, which action may be interpreted as a command to reference-mark the selected portion of the document. This may require the user 108 to first select an option in a menu, or otherwise provide a command, that reference-marking is to be enabled for the current document. Alternatively, the user 108 may use the input device 116 to right-click on the selected portion of the document, which would call up a command menu. One of the entries in the command menu may be labeled "Reference-Mark Selection" or an equivalent label. The user 108 may then use the input device 116 to select that command, the effect of which is the same as if the user 108 had used the input device 116 to indicate the scrollbar. The user 108 may also provide a hotkey combination through the input device 116, which combination may be interpreted as a command to reference-mark the selected portion of the document. Such a hotkey combination may be, but is not limited to, pressing the control key and the R key on a keyboard at the same time, though any combination of keys may be used.

The reference marking process 140-2 then receives the command to mark the selection of the portion of the document with a reference mark, step 302. As described above, the reference marking process 140-2 may receive this command by receiving input from an input device, such as the input device 116, wherein the input indicates that a user used the input device to click on the scrollbar, step 304. As also described above, the reference marking process 140-2 may receive this command by receiving input from an input device, such as the input device 116, wherein the input indicates that a user used the input device to select an entry in a menu, step 305. Further, the reference marking process 140-2 may receive this command by receiving input from an input device, such as the input device 116, wherein the input indicates that a user used the input device to provide a hotkey combination that is associated with a command to reference-mark the selected portion of the document.

After receiving a command to mark the selection of the portion of the document with a reference, the reference marking process 140-2 places a reference mark 184 (as seen in FIG. 2B) in the scrollbar, step 303. The reference mark indicates the selected portion of the document. At least one characteristic of the reference mark may depend on the selected portion of the document, step 306. For example, the color of a reference mark, the shape of a reference mark, the size of a reference mark, the orientation of a reference mark, and any other characteristics of a reference mark, or combinations thereof, may indicate to a user what the selected portion of the document that the reference mark refers to is. The examples given herein with regards to the association of one or more characteristics of a reference mark with one or more elements of a document are for illustrative purposes and are not limiting. The reference marking process 140-2 may be configured to associate one or more characteristics of a reference mark with one or more elements of a document, in a variety of combinations.

FIGS. 4A-4C illustrate how the reference marking process 140-2 may place a reference mark on a scrollbar, wherein the reference mark identifies a particular element of a document. For example, when the reference marking process 140-2 receives a selection of content in a document, step 401, and then receives a command to mark the selected content with a reference mark, step 402, the reference marking process 140-2 places a reference mark in the scrollbar, wherein the reference mark indicates the selected content, step 403. That reference mark may be, for example, a red circle with a horizontal line from one interior edge of the circle to the other interior edge of the circle, wherein such a reference mark indicates content such as text. Alternatively, the reference mark may be the same shape, but yellow in color, which may indicate content such as a graphic. Further, a reference mark of the same shape but blue in color may indicate content such as audio or video.

Pages of a document may similarly be indicated by reference marks for quick and easy access to a particular page. After the reference marking process 140-2 receives a selection of a page of a document, step 404, and receives a command to mark the selected page with a reference mark, step 405, the reference marking process 140-2 places a reference mark in the scrollbar, wherein the reference mark indicates the selected page, step 406. A reference mark for a page may be, for example, a circle surrounding the number of that page. The color, orientation, size, or any other characteristic of the reference mark may vary depending on, for example, the type of page (a title page, an index page, a page containing footnotes, etc.).

Sortable charts in a document, or a document that comprises one or more sortable charts, may also include reference marks to indicate, quickly and easily, a particular column.

The process is similar to reference-marking a page or particular content, as described above. With a sortable chart, it is also possible for the reference marking process 140-2 to mark all rows and/or all columns that include a particular identifier. For example, the reference marking process 140-2 may reference-mark every column with a header begins with the letter S. The reference marking process 140-2 receives a selection of a column in a sortable chart, wherein the column includes an identifier that identifies at least one column in the sortable chart, step 407, in this case the letter S. The reference marking process 140-2 then receives a command to mark the selected column of the sortable chart with a reference mark, step 408, which causes the reference marking process 140-2 places a reference mark in the scrollbar for each column that has the identifier of the selected column, step 409. In this example, the reference marking process 140-2 places a reference mark in the scrollbar for each column with a header that begins with the letter S. The identifier is not limited to a particular letter, and may be any identifier that indicates one or more rows and/or columns within the sortable chart. This method may also be used with other elements in a document. For example, for pages, the reference marking process 140-2 may be configured to reference-mark every one of a particular page, such as every fifth page or every chapter title page. Such a command could be included in a menu of commands that appears after a user 108 selects a page within a document and uses an input device 116 to call up such a menu. Similarly, for content, the reference marking process 140-2 may be configured to reference-mark, for example, all pictures within a document after a user 108 selects a picture within the document and, using an input device 116, selects such a command.

After the reference marking process 140-2 places a reference mark for a document on a scrollbar associated with that document, a user such as the user 108 (shown in FIG. 1) may activate that reference mark by selecting it with an input device, such as the input device 116 (also shown in FIG. 1). The reference mark interpreter process 150-2 receives this selection of a first reference mark located on a scrollbar, step 501. The reference mark interpreter process 150-2 then changes the display of the document in the window on the display device that contains the document. The reference mark interpreter process 150-2 changes the display so that at least the beginning of a first (second) portion of the document indicated by the first (second) reference mark is displayed in the window on the display device, step 502. Thus, the user 108 is able to quickly and easily return to a previously reference-marked portion of the document.

Upon changing the display of the document in the window on the display device, so that the portion of the document indicated by the selected reference mark is shown, the reference mark interpreter process 150-2 may also highlight the portion of the document indicated by that reference mark, step 503. Highlighting the portion of the document makes it easier for the user to see that portion of the document. Additionally, highlighting the portion of the document may make that portion of the document instantly available for operations, step 505, for example but not limited to editing operations such as copying, cutting, and/or pasting, as well as other operations depending on the type of document.

When a document includes a number of reference marks, a user may have trouble distinguishing between reference marks, even if the reference marks have different characteristics reflecting the different elements of the document each references. Thus, the reference mark interpreter process 150-2 includes a preview function. When a user places a cursor or other input device marker over a reference mark, the reference mark interpreter process 150-2 previews the portion of the document indicated by that reference mark by displaying some of the portion of the document, step 504. Thus, a user is quickly and easily able to see what each reference mark refers to, and a user is able to distinguish between reference marks without having to know what characteristics of a reference mark indicate what elements of a document.

A user may select more than one reference mark at a time, to allow that user to access the portions of a document indicated by each reference mark for operations even if those portions of the document are not continuous. The reference mark interpreter process 150-2 receives a selection of a first reference mark located on a scrollbar, the reference mark indicating a portion of a document, wherein the selection is made with an input device, step 601. The document is displayed in a window on a display device. The reference mark interpreter process 150-2 then receives a selection of a second reference mark with the input device, the second reference mark located on the scrollbar and indicating a second portion of the document that is not contiguous with the first portion of the document indicated by the first reference mark, step 602. The reference mark interpreter application changes the display of the document in the window on the display device so that at least the beginning of a first portion of the document indicated by the first reference mark is displayed in the window on the display device, step 603. The reference mark interpreter process 150-2 then makes the portions of the document indicated by the selected reference marks available for editing operations according to the order the reference marks corresponding to those portions were selected, step 604. Thus, a user is able to, for example but not limited to, select two or more reference marks and then copy and paste the elements of the document associated with those reference marks, even if those elements of the document are not next to each other within the document. Optionally, in step 605 the elements of the document selected for editing functions may be non-contiguous selections.

As seen in FIGS. 7A-7C, the reference mark interpreter process 150-2 interprets a reference mark in the same way regardless of the element or elements of a document that the reference mark indicates. When the reference mark interpreter process 150-2 receives a selection of a first reference mark located on a scrollbar, and the portion of the document indicated by the first reference mark is content, step 701, the reference mark interpreter process 150-2 changes the display of the document in its window on the display device so that at least the beginning of the content indicated by the first reference mark is displayed in the window on the display device, step 702. When the reference mark interpreter process 150-2 receives a selection of a first reference mark located on a scrollbar, and the portion of the document indicated by the first reference mark is a page, step 703, the reference mark interpreter process 150-2 changes the display of the document in its window on the display device so that at least the beginning of the page indicated by the first reference mark is displayed in the window on the display device, step 704. When the reference mark interpreter process 150-2 receives a selection of a first reference mark located on a scrollbar, and the portion of the document indicated by the first reference mark is a column of a sortable chart, step 705, the reference mark interpreter process 150-2 changes the display of the document in the window on the display device so that at least the beginning of the column of the sortable chart indicated by the first reference mark is displayed in the window on the display device, step 706.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
receiving a selection of a portion of a document;
receiving a command to mark the selection of the portion of the document with a reference mark;
placing the reference mark in a scrollbar, the scrollbar associated with the document, wherein the reference mark indicates the selected portion of the document, and wherein a graphical placement of the reference mark in the scrollbar corresponds to a relative position of the selection of the portion in the document;
receiving a selection of a first reference mark located on the scrollbar,
wherein the selection of the first reference mark is made with an input device;
changing a display of the document in a window on a display device so that at least a beginning of a first portion of the document indicated by the first reference mark is displayed in the window on the display device;
receiving a selection of a second reference mark with the input device at a time of selection of the first reference mark, the second reference mark located on the scrollbar, the second reference mark indicating a second portion of the document that is not contiguous with the first portion of the document indicated by the first reference mark;

making the indicated portions of the document available for editing operations according to an order that the selected reference marks were selected from the scrollbar, without making available for editing operations portions of the document in between the indicated portions;

receiving, in a particular order, a selection of multiple reference marks located on the scrollbar associated with the document, at least two of the selected reference marks indicating portions on the document that are not contiguous with each other, wherein the selection of multiple reference marks is made with the input device; and in response to receiving the selection of multiple reference marks in the particular order, selecting contents of each portion of the document indicated by the selected reference marks for a copy operation of the selected contents, wherein the copy operation simultaneously copies the contents of each indicated portion of the document in the particular order without copying content from the document located in between the indicated portions of the document.

2. The computer-implemented method of claim 1 wherein receiving the command comprises:
receiving the command to mark the selection of the portion of the document with the reference mark by receiving input from the input device, wherein the input indicates that a user used the input device to click on the scrollbar.

3. The computer-implemented method of claim 1 wherein receiving the command comprises:
receiving the command to mark the selection of the portion of the document with the reference mark by receiving input from the input device, wherein the input indicates that a user used the input device to select an entry in a menu.

4. The computer-implemented method of claim 1 wherein placing comprises:
placing the reference mark in the scrollbar, wherein at least one characteristic of the reference mark depends on the selected portion of the document.

5. The computer-implemented method of claim 1 further comprising:
wherein receiving the selection of the portion of the document comprises:
receiving a selection of content in the document;
wherein receiving the command comprises:
receiving a command to mark the selected content with the reference mark;
wherein placing comprises:
placing the reference mark in the scrollbar, wherein the reference mark indicates the selected content;
wherein receiving the selection of the first reference mark comprises:
receiving the selection of the first reference mark located on the scrollbar, wherein the first portion of the document indicated by the first reference mark is content; and
wherein changing the display of the document comprises:
changing the display of the document in the window on the display device so that at least a beginning of the content indicated by the first reference mark is displayed in the window on the display device.

6. The computer-implemented method of claim 1 further comprising:
wherein receiving the selection of the portion of the document comprises:
receiving a selection of a page of the document;
wherein receiving the command comprises:
receiving a command to mark the selected page with the reference mark;
wherein placing comprises:
placing the reference mark in the scrollbar, wherein the reference mark indicates the selected page;
wherein receiving the selection of the first reference mark comprises:
receiving the selection of the first reference mark located on the scrollbar, wherein the first portion of the document indicated by the first reference mark is a page; and
wherein changing the display of the document comprises:
changing the display of the document in the window on the display device so that at least a beginning of the page indicated by the first reference mark is displayed in the window on the display device.

7. The computer-implemented method of claim 1 further comprising:
wherein receiving the selection of the portion of the document comprises:
receiving a selection of a column in a sortable chart, wherein the column includes an identifier, wherein the identifier identifies at least one column in the sortable chart;
wherein receiving the command comprises:
receiving a command to mark the selected column of the sortable chart with the reference mark;
wherein placing comprises:
placing the reference mark in the scrollbar for each column that has the identifier of the selected column;
wherein receiving the selection of the first reference mark comprises:
receiving the selection of the first reference mark located on the scrollbar, wherein the first portion of the document indicated by the first reference mark is the column of the sortable chart; and
wherein changing the display of the document comprises:
changing the display of the document in the window on the display device so that at least a beginning of the column of the sortable chart indicated by the first reference mark is displayed in the window on the display device.

8. The computer-implemented method of claim 7, wherein receiving the selection of the column in the sortable chart comprises:
receiving a selection of the column in sortable chart that is nested within the document, wherein the sortable chart has two scrollbars independent of the scrollbar of the document.

9. The computer-implemented method of claim 1 comprising:
highlighting the first portion of the document indicated by the selected first reference mark when that portion is displayed in the window on the display device;
making the first portion of the document indicated by the selected first reference mark available for editing operations; and
previewing the first portion of the document indicated by the first reference mark by displaying some of the first portion of the document indicated by the first reference mark when a cursor is placed over the first reference mark on the scrollbar.

10. The computer-implemented method of claim 1, further comprising:
receiving multiple selections of portions of the document, each selected portion being different from other selected portions;

receiving a command to mark each of the multiple selections of portions of the document with a reference mark;

placing reference marks in the scrollbar, wherein each reference mark placed in the scrollbar indicates a corresponding selected portion of the document; and changing the display of the document in the window on the display device so that at least a beginning of contents of a portion of the document indicated by a first-selected reference mark is displayed in the window on the display device.

11. The computer-implemented method of claim 10, further comprising:

highlighting the first portion of the document indicated by the selected first reference mark when that portion is displayed in the window on the display device;

making the first portion of the document indicated by the selected first reference mark available for editing operations;

previewing the first portion of the document indicated by the first reference mark by displaying some of the first portion of the document indicated by first reference mark when a cursor is placed over the first reference mark on the scrollbar;

wherein receiving the command to mark the selection comprises:

receiving the command to mark the selection of the portion of the document with the reference mark by receiving input from an input device, wherein the input indicates that a user used the input device to click on the scrollbar or select an entry in a menu; and wherein placing the reference marks in the scrollbar comprises:

placing reference marks in the scrollbar, wherein at least one characteristic of each reference mark depends on the selected portion of the document.

12. The computer-implemented method of claim 11, further comprising:

wherein receiving the selection of the portion of the document comprises:

receiving a selection of a page of a document;

wherein receiving the command to mark the selection of the portion of the document with the reference mark comprises:

receiving a command to mark the selected page with the reference mark;

wherein placing the reference mark in the scrollbar comprises:

placing the reference mark in the scrollbar, wherein the reference mark indicates the selected page;

wherein receiving the selection of the first reference mark comprises:

receiving the selection of the first reference mark located on the scrollbar, wherein the first portion of the document indicated by the first reference mark is the page; and wherein changing the display of the document comprises:

changing the display of the document in the window on the display device so that at least a beginning of the page indicated by the first reference mark is displayed in the window on the display device.

13. The computer-implemented method of claim 12, further comprising:

at a time of receiving the selection of the page of the document, receiving a command to automatically mark subsequent pages at a predetermined interval with reference marks in the scrollbar.

14. The computer-implemented method of claim 11, wherein receiving the command to mark the selection of the portion of the document with the reference mark comprises:

receiving the command to mark the selection of the portion of the document with the reference mark by receiving a hotkey combination input through the input device, wherein the hotkey combination input indicates that the user used the input device to enter a combination of keys.

15. The computer-implemented method of claim 10, wherein receiving the selection of the portion of the document comprises:

receiving a selection of a first picture in the document;

and wherein receiving the command to mark the selection of the portion of the document with the reference mark comprises:

receiving a command to automatically mark all remaining pictures in the document with reference marks in the scrollbar.

16. The computer-implemented method of claim 10, further comprising:

highlighting a first portion of the document indicated by the selected first-selected reference mark when that portion is displayed in the window on the display device;

making the first portion of the document indicated by the first-selected reference mark available for editing operations;

previewing the first portion of the document indicated by the first-selected reference mark by displaying some of the first portion of the document indicated by the first-selected reference mark when a cursor is placed over the first-selected reference mark on the scrollbar;

wherein receiving the command to mark each of the multiple selections of portions of the document with the reference mark comprises:

receiving the command to mark each of the multiple selections of portions of the document with the reference mark by receiving input from the input device, wherein the input indicates that a user used the input device to click on the scrollbar or to select an entry in a menu; and wherein placing reference marks in the scrollbar comprises:

placing reference marks in the scrollbar, wherein at least one graphical characteristic of each reference mark depends on the selected portion of the document.

17. The computer-implemented method of claim 11, further comprising:

wherein receiving multiple selections of portions of the document comprises:

receiving selections of individual pages of the document;

wherein receiving the command to mark each of the multiple selections of portions of the document with the reference mark comprises:

receiving a command to mark the selected pages with reference marks;

wherein placing reference marks in the scrollbar comprises:

placing reference marks in the scrollbar, wherein the reference marks indicate the selected pages;

wherein receiving the selection of the first-selected reference mark comprises:

receiving the selection of the first-selected reference mark located on the scrollbar, wherein the first portion of the document indicated by the first-selected reference mark is a page; and wherein changing the display of the document comprises:

changing the display of the document in the window on the display device so that at least the beginning of the page indicated by the first-selected reference mark is displayed in the window on the display device.

18. A computer system comprising:
a memory;
a processor;
a display;
an interconnection mechanism coupling the memory, the processor and the display allowing communication there between;
   wherein the memory is encoded with a reference marking application, that when executed in the processor, provides a reference marking process that places a reference mark for a document on a scrollbar, by causing the computer system to perform the operations of:
   receiving a selection of a portion of the document;
   receiving a command to mark the selection of the portion of the document with the reference mark;
   placing the reference mark in the scrollbar, the scrollbar associated with the document, wherein the reference mark indicates the selected portion of the document, and wherein a graphical placement of the reference mark in the scrollbar corresponds to a relative position of the selection of the portion in the document;
   receiving a selection of a first reference mark located on the scrollbar,
      wherein the selection of the first reference mark is made with an input device;
   changing a display of the document in a window on a display device so that at least a beginning of a first portion of the document indicated by the first reference mark is displayed in the window on the display device;
   receiving a selection of a second reference mark with the input device at a time of selection of the first reference mark, the second reference mark located on the scrollbar, the second reference mark indicating a second portion of the document that is not contiguous with the first portion of the document indicated by the first reference mark;
   making the indicated portions of the document available for editing operations according to an order that the selected reference marks were selected from the scrollbar, without making available for editing operations portions of the document in between the indicated portions;
   receiving, in a particular order, a selection of multiple reference marks located on the scrollbar associated with the document, at least two of the selected reference marks indicating portions on the document that are not contiguous with each other, wherein the selection of multiple reference marks is made with the input device; and
   in response to receiving the selection of multiple reference marks in the particular order, selecting contents of each portion of the document indicated by the selected reference marks for a copy operation of the selected contents, wherein the copy operation simultaneously copies the contents of each indicated portion of the document in the particular order without copying content from the document located in between the indicated portions of the document.

19. A computer program product, stored on computer readable medium, to place a reference mark for a document on a scrollbar associated with the document, the document displayed in a window on a display device that is part of a computer system, the computer program product comprising:
   computer program code for receiving a selection of a portion of a document from an input device, wherein the input device is part of the computer system;
   computer program code for receiving a command to mark the selection of the portion of the document with the reference mark, wherein the command is received from the input device;
   computer program code for placing the reference mark in the scrollbar, the scrollbar associated with the document, wherein the reference mark indicates the selected portion of the document, and wherein a graphical placement of the reference mark in the scrollbar corresponds to a relative position of the selection of the portion in the document;
   computer program code for receiving a selection of a first reference mark located on the scrollbar, wherein the selection of the first reference mark is made with an input device;
   computer program code for changing a display of the document in the window on the display device so that at least a beginning of a first portion of the document indicated by the first reference mark is displayed in the window on the display device;
   computer program code for receiving a selection of a second reference mark with the input device at a time of selection of the first reference mark, the second reference mark located on the scrollbar, the second reference mark indicating a second portion of the document that is not contiguous with the first portion of the document indicated by the first reference mark;
   computer program code for making the indicated portions of the document available for editing operations according to an order that the selected reference marks were selected from the scrollbar, without making available for editing operations portions of the document in between the indicated portions;
   computer program code for receiving, in a particular order, a selection of multiple reference marks located on the scrollbar associated with the document, at least two of the selected reference marks indicating portions on the document that are not contiguous with each other, wherein the selection of multiple reference marks is made with the input device; and
   computer program code for, in response to receiving the selection of multiple reference marks in the particular order, selecting contents of each portion of the document indicated by the selected reference marks for a copy operation of the selected contents, wherein the copy operation simultaneously copies the contents of each indicated portion of the document in the particular order without copying content from the document located in between the indicated portions of the document.

20. A method of placing reference marks for a document on a scrollbar, and of interpreting the reference marks on the scrollbar, the method comprising:
   receiving multiple selections of portions of a document, each selected portion being different from other selected portions;
   receiving a command to mark each of the multiple selections of portions of the document with a reference mark;
   placing reference marks in a scrollbar, the scrollbar associated with the document, wherein each reference mark in the scrollbar indicates a corresponding selected portion of the document, receiving, in a particular order, a selection of multiple reference marks located on the scrollbar associated with the document, at least two of the selected reference marks indicating portions on the document that are not contiguous with each other, wherein the selection of multiple reference marks is made with an input device;

in response to receiving the selection of multiple reference marks in the particular order, selecting contents of each portion of the document indicated by the selected reference marks for a copy operation of the selected contents, wherein the copy operation simultaneously copies the contents of each indicated portion of the document in the particular order without copying content from the document located in between the indicated portions of the document; and changing a display of the document in a window on the display device so that at least a beginning of contents of the portion of the document indicated by a first-selected reference mark is displayed in the window on the display device.

* * * * *